(12) United States Patent
Mills

(10) Patent No.: US 9,796,262 B2
(45) Date of Patent: Oct. 24, 2017

(54) VALVE ASSEMBLY FOR A TANK OF A VEHICLE AND A METHOD OF CREATING A VACUUM IN THE TANK

(71) Applicant: Eaton Corporation, Cleveland, OH (US)

(72) Inventor: Vaughn Kevin Mills, Chelsea, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 14/570,415

(22) Filed: Dec. 15, 2014

(65) Prior Publication Data
US 2015/0096625 A1 Apr. 9, 2015

Related U.S. Application Data

(63) Continuation of application No. PCT/US2013/074862, filed on Dec. 13, 2013.
(Continued)

(51) Int. Cl.
*F16K 31/18* (2006.01)
*F16K 33/00* (2006.01)
(Continued)

(52) U.S. Cl.
CPC ..... *B60K 15/03519* (2013.01); *F02M 25/089* (2013.01); *F02M 25/0836* (2013.01);
(Continued)

(58) Field of Classification Search
CPC F16K 17/048; F02M 25/089; F02M 25/0836; B60K 2015/0321;
(Continued)

(56) References Cited

U.S. PATENT DOCUMENTS 1,493,083 A * 5/1924 Ripley ................. F16K 17/196
137/493.9
2,074,329 A * 3/1937 Gieseman ....................... 137/43
(Continued)

FOREIGN PATENT DOCUMENTS

JP 08-014115 A 1/1996
WO WO2006064493 A1 6/2006

OTHER PUBLICATIONS

Article entitled "OBD II Code P0442" from the website http://repairpal.com/OBD-II-Code-P0442; retrieval: Oct. 2013; 4 pages.

*Primary Examiner* — Craig J Price
(74) *Attorney, Agent, or Firm* — Quinn IP Law

(57) ABSTRACT

A valve assembly for a tank of a vehicle and a method of creating a vacuum are disclosed. A valve body defines a cavity and an outlet in fluid communication with the cavity for venting the tank. The assembly includes a seat disposed in the cavity of the valve body. The seat separates the cavity into first and second cavity portions. The seat defines an aperture to provide fluid communication between the first and second cavity portions. The assembly includes a cover device disposed between the seat and the outlet. The cover device defines at least one hole therethrough. The cover device is movable between a rest position engaging the seat to minimize fluid communication between the aperture and the hole and an actuated position spaced from the seat to increase fluid communication between the aperture and the hole when a vacuum is created in the first cavity portion.

20 Claims, 5 Drawing Sheets

Related U.S. Application Data

(60) Provisional application No. 61/898,677, filed on Nov. 1, 2013, provisional application No. 61/745,675, filed on Dec. 24, 2012.

(51) Int. Cl.

| | | |
|---|---|---|
| *B60K 15/035* | (2006.01) | |
| *F16K 17/04* | (2006.01) | |
| *F16K 24/04* | (2006.01) | |
| *F02M 25/08* | (2006.01) | |
| *B60K 15/03* | (2006.01) | |

(52) U.S. Cl.
CPC .......... *F16K 17/048* (2013.01); *F16K 24/042* (2013.01); *B60K 2015/0319* (2013.01); *B60K 2015/0321* (2013.01); *B60K 2015/03276* (2013.01); *B60K 2015/03289* (2013.01); *B60K 2015/03514* (2013.01); *Y10T 137/0379* (2015.04); *Y10T 137/3099* (2015.04); *Y10T 137/7895* (2015.04); *Y10T 137/7904* (2015.04); *Y10T 137/7922* (2015.04)

(58) Field of Classification Search
CPC .. B60K 2015/0319; B60K 2015/03289; B60K 15/03519; B60K 2015/03514; B60K 2015/03276; Y10T 137/7922; Y10T 137/7904; Y10T 137/7895; Y10T 137/3099; Y10T 137/0379; Y10T 137/053; Y10T 137/0753; Y10T 137/077; Y10T 137/0826; Y10T 137/0874; Y10T 137/6004; Y10T 137/7358; Y10T 137/7404; Y10T 137/7423; Y10T 137/7426; Y10T 137/86332; Y10T 137/8634; Y10T 137/2562; Y10T 137/7778; Y10T 137/7783; Y10T 137/7826; Y10T 137/7879; Y10T 137/7881

USPC ....... 137/15.26, 38, 39, 41, 43, 202, 315.08, 137/409, 423, 429, 430, 587, 588, 510, 137/843, 845, 493.7, 496, 110; 141/59, 141/198, 202, 229, 95, 302; 123/516, 123/518, 198 D, 520; 220/86.2

See application file for complete search history.

(56) References Cited

U.S. PATENT DOCUMENTS

| | | | | |
|---|---|---|---|---|
| 3,616,783 | A * | 11/1971 | LaMasters | 123/519 |
| 3,768,498 | A * | 10/1973 | Urban | 137/43 |
| 4,050,471 | A * | 9/1977 | Anhegger et al. | 137/39 |
| 5,449,018 | A * | 9/1995 | Harris | 137/493.9 |
| 5,462,100 | A * | 10/1995 | Covert et al. | 141/59 |
| 5,582,198 | A * | 12/1996 | Nagino et al. | 137/43 |
| 5,603,349 | A * | 2/1997 | Harris | B60K 15/035 123/519 |
| 5,722,468 | A * | 3/1998 | Kido | 141/59 |
| 5,896,882 | A * | 4/1999 | McGrath, Jr. | 137/496 |
| 5,909,747 | A * | 6/1999 | Schieber | 137/492 |
| 5,931,183 | A * | 8/1999 | Yoshihara | 137/202 |
| 6,003,539 | A * | 12/1999 | Yoshihara | 137/202 |
| 6,058,970 | A * | 5/2000 | Osaki et al. | 137/587 |
| 6,386,222 | B1 | 5/2002 | Harris | |
| 6,415,772 | B1 | 7/2002 | Yoshioka et al. | |
| 7,219,683 | B2 * | 5/2007 | Furuya | F16K 17/196 137/198 |
| 2003/0089405 | A1 * | 5/2003 | Mills | 137/587 |
| 2003/0094204 | A1 | 5/2003 | Cholod | |
| 2004/0163718 | A1 | 8/2004 | Muto et al. | |

\* cited by examiner

VALVE ASSEMBLY FOR A TANK OF A VEHICLE AND A METHOD OF CREATING A VACUUM IN THE TANK

CROSS-REFERENCE TO RELATED APPLICATIONS

This application is a bypass continuation application of International Application No. PCT/US2013/074862 filed Dec. 13, 2013, which claims priority to U.S. Provisional Application No. 61/745,675 filed Dec. 24, 2012 and U.S. Provisional Application No. 61/898,677 filed Nov. 1, 2013.

TECHNICAL FIELD

The present teachings generally relate to a valve assembly for a tank of a vehicle and a method of creating a vacuum in the tank.

BACKGROUND

Fuel tank valves that function to vent vapors from a fuel tank are known. Generally, the vapors vent out to a canister that stores and purges the vapors over a period of time. Vehicle diagnostics can be utilized to detect vapor flow between, for example, the fuel tank and the canister.

SUMMARY

The present teachings generally include a valve assembly for a tank of a vehicle. The valve assembly includes a valve body adapted to be attached to the tank. The valve body defines a cavity along a longitudinal axis and defines an outlet in fluid communication with the cavity for venting the tank. The valve assembly also includes a seat disposed in the cavity of the valve body. The seat separates the cavity into a first cavity portion and a second cavity portion. The seat defines an aperture along the longitudinal axis to provide fluid communication between the first and second cavity portions. The valve assembly further includes a cover device disposed between the seat and the outlet. The cover device defines at least one hole therethrough. The cover device is movable between a rest position engaging the seat to minimize fluid communication between the aperture and the hole and an actuated position spaced from the seat to increase fluid communication between the aperture and the hole when a vacuum is created in the first cavity portion.

The present teachings also generally include another valve assembly for a tank of a vehicle. The valve assembly includes a valve body adapted to be attached to the tank. The valve body defines a cavity along a longitudinal axis and defines an outlet in fluid communication with the cavity for venting the tank. The valve assembly also includes a seat disposed in the cavity of the valve body. The seat separates the cavity into a first cavity portion and a second cavity portion. The seat includes a platform defining an aperture along the longitudinal axis to provide fluid communication between the first and second cavity portions. The valve assembly further includes a cover device disposed between the seat and the outlet. The cover device defines at least one hole therethrough. The cover device is movable between a rest position engaging the platform to minimize fluid communication between the aperture and the hole and an actuated position spaced from the platform to increase fluid communication between the aperture and the hole when a vacuum is created in the first cavity portion. The first and second cavity portions have a substantially equal first pressure when the cover device is in the rest position. The first cavity portion obtains a second pressure less than the first pressure of the second cavity portion when the vacuum is created in the first cavity portion which moves the cover device to the actuated position to increase fluid communication between the first and second cavity portions.

The present teachings further generally include a method of creating the vacuum in the tank of the vehicle when performing a diagnostic test. The method includes providing the valve body adapted to be attached to the tank. The valve body includes the first cavity portion and the second cavity portion separated by the first seat as discussed above. The method also includes minimizing flow of gaseous fluid between the hole in the cover device and the aperture of the seat when the cover device is in the rest position engaging the seat. The first and second cavity portions each have a substantially equal pressure when the cover device is in the rest position. The method further includes removing gaseous fluid from the first cavity portion of the valve body to create the vacuum in the first cavity portion and a pressure difference between the first and second cavity portions. In addition, the method includes moving the cover device to the actuated position spaced from the seat in response to the vacuum creating the pressure difference between the first and second cavity portions. Furthermore, the method includes increasing flow of the gaseous fluid between the hole in the cover device and the aperture of the seat when the cover device is in the actuated position to increase flow of the gaseous fluid between the first and second cavity portions to create the vacuum in the tank.

Therefore, the cover device is designed to quickly move to the actuated position to quickly increase fluid communication through the valve assembly and quickly create the vacuum in the tank.

The above features and advantages and other features and advantages of the present teachings are readily apparent from the following detailed description of the best modes for carrying out the present teachings when taken in connection with the accompanying drawings.

DETAILED DESCRIPTION

Figure 1:
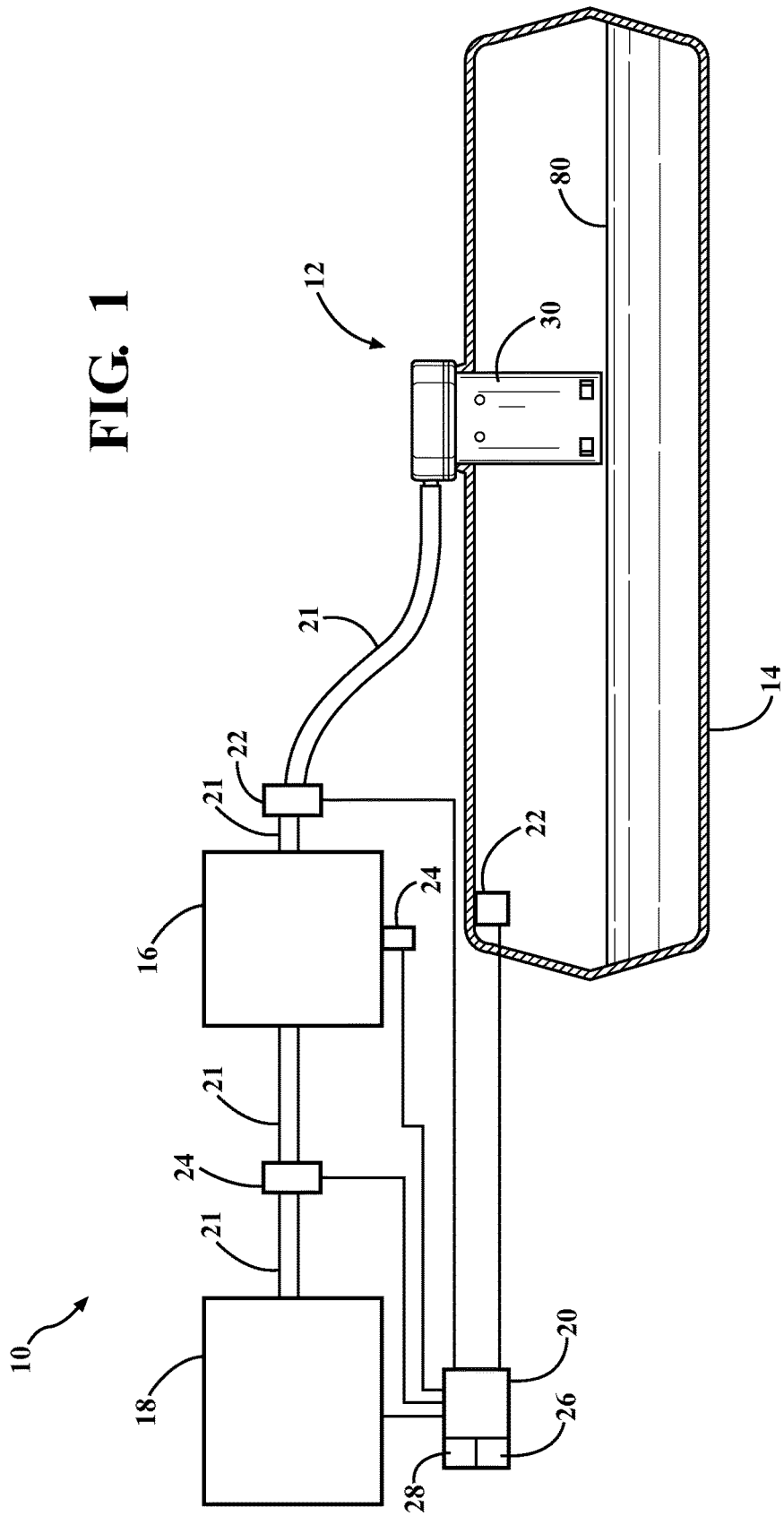
FIG. 1 is a schematic partial cross-sectional side illustration of a fluid detection system, with a valve assembly mounted to a tank.
Figure 2:
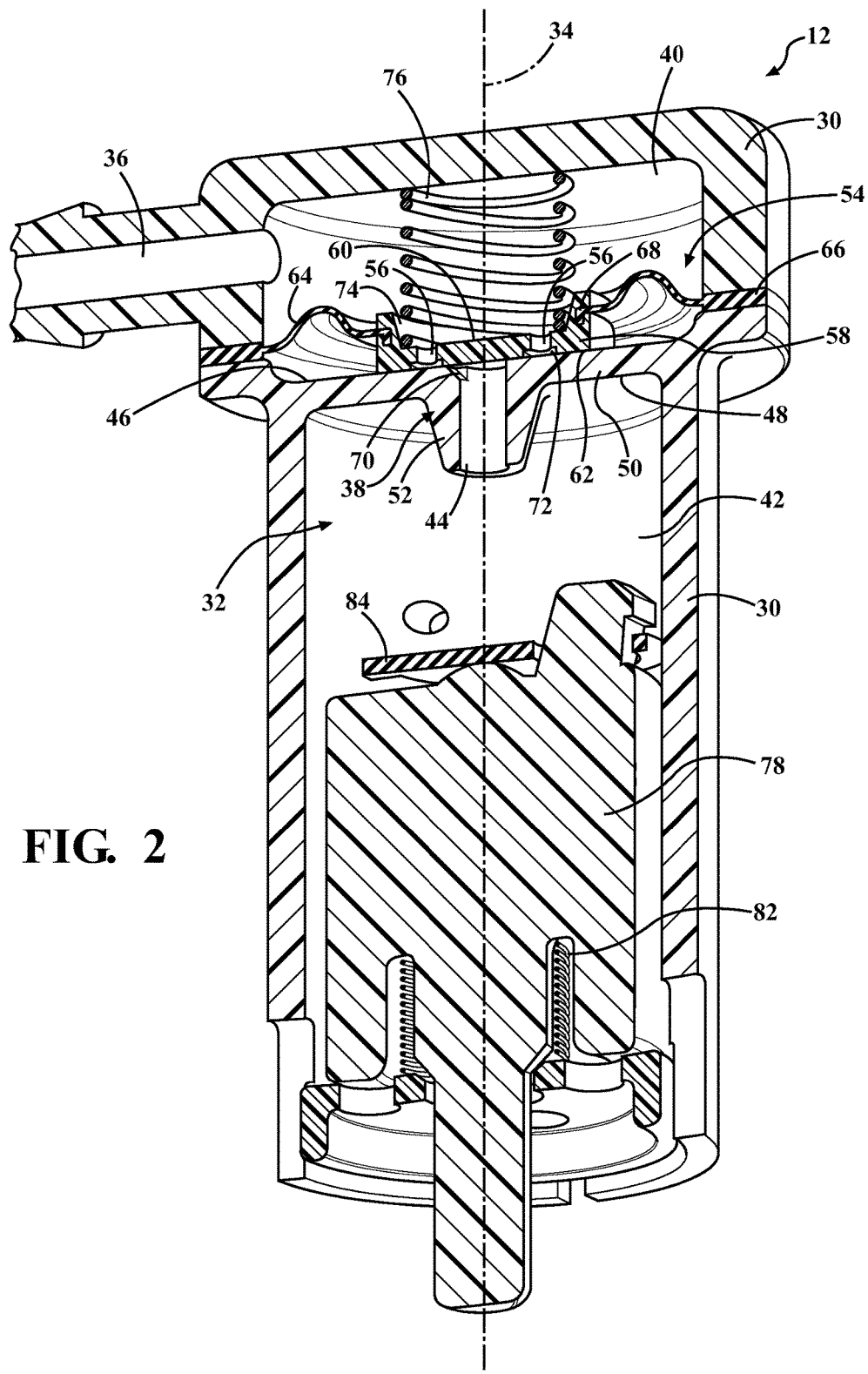
FIG. 2 is a schematic broken cross-sectional perspective view of the valve assembly, with a cover device in a rest position and a float in a first position.

Referring to the Figures, wherein like numerals indicate like or corresponding parts throughout the several views, generally, a fluid detection system 10 for a vehicle is shown in FIG. 1. The fluid detection system 10 can include a valve assembly 12 for a tank 14 of the vehicle, which is generally shown in FIGS. 1 and 2. In certain embodiments, the tank 14 can be a fuel tank 14 of the vehicle. Therefore, liquid fluid, such as fuel can be stored in the tank 14. It is to be appreciated that the valve assembly 12 can be utilized with tanks 14 other than fuel tanks 14. Therefore, other liquid fluids can be stored in the tank 14.

The valve assembly 12 can be internally mounted to the tank 14 or externally mounted to the tank 14 as shown in FIG. 1. For the externally mounted valve assembly 12, a portion of the valve assembly 12 is disposed inside the tank 14 and another portion of the valve assembly 12 is disposed outside of the tank 14 as shown in FIG. 1. The features of the valve assembly 12 discussed herein are the same for the internally mounted valve assembly 12 and the externally mounted valve assembly 12. It is to be appreciated that other components can be utilized with the internally or externally mounted valve assembly 12, such as for example, with the internally mounted valve assembly 12, a nipple can extend through the tank 14 to couple the valve assembly 12 inside the tank 14 to outside of the tank 14 and a bracket can support the valve assembly 12 inside the tank 14.

Generally, the fluid detection system 10 can include a vapor control structure 16 (see FIG. 1) that receives gaseous fluid, such as vapors from the tank 14. The valve assembly 12 allows the gaseous fluid, such as vapors, that build up in the tank 14 to be vented out of the tank 14 to the vapor control structure 16. The vapor control structure 16 can store and/or purge the vapors received from the tank 14. Therefore, under certain conditions, the vapors move or flow from the tank 14 through the valve assembly 12 and into the vapor control structure 16. It is to be appreciated that the vapor control structure 16 can be a canister, such as a charcoal canister.

Continuing with FIG. 1, the fluid detection system 10 can include a vacuum apparatus 18 coupled to the vapor control structure 16 to create a vacuum in the valve assembly 12 and the tank 14. As such, the vacuum apparatus 18 is in fluid communication with the tank 14, the valve assembly 12 and the vapor control structure 16. Therefore, when the vacuum apparatus 18 is actuated, vapors flow from the tank 14, through the valve assembly 12, through the vapor control structure 16 and into the vacuum apparatus 18. Simply stated, the vacuum apparatus 18 pulls the vapors from the tank 14 and the vapor control structure 16 to the vacuum apparatus 18. The vacuum apparatus 18 can also purge the vapors from the tank 14, the valve assembly 12, and the vapor control structure 16. It is to be appreciated that the vacuum apparatus 18 can be a pump.

The fluid detection system 10 can also include a controller 20 for actuating the vacuum apparatus 18 to create the vacuum in the valve assembly 12, and thus the tank 14. For example, the vacuum apparatus 18 can be activated when it is desirable to check the vapor flow of the system 10. Therefore, the fluid detection system 10 can determine whether there is undesirable vapor seepage to the atmosphere through the tank 14, the vapor control structure 16, the valve assembly 12, and/or fluid tubes 21 (see FIG. 1) between the tank 14 and the vacuum apparatus 18.

The fluid detection system 10 can also include one or more sensors 22, such as a pressure sensor 22, to measure the amount of pressure in the tank 14, in the vapor control structure 16 and/or in the fluid tubes 21 between the tank 14 and the vacuum apparatus 18. For example, as shown in FIG. 1, in one embodiment, the sensor 22 can be mounted in the tank 14. As another example, also shown in FIG. 1, in another embodiment, the sensor 22 can be mounted between the tank 14 and the vapor control structure 16. Generally, when performing a diagnostic test to the vehicle, the controller 20 is in communication with the sensor 22; therefore, the sensor 22 signals the controller 20 whether the desired amount of pressure for the desired amount of time has been obtained. It is to be appreciated that two sensors 22 are shown in FIG. 1 for illustrative purposes only to indicate different locations that the sensor 22 can be disposed, and therefore, generally, both of these sensors 22 are not utilized together in this system 10.

If the desired amount of pressure for the desired amount of time has been obtained, the vapor flow from the tank 14 to the vacuum apparatus 18 is suitable and the vehicle passes the diagnostic test. If the desired amount of pressure for the desired amount of time is not obtained, an undesirable amount of vapors are seeping to the atmosphere through the system 10 (e.g., vapors seeping through one or more of the tank 14, the vapor control structure 16, the valve assembly 12, and the fluid tubes 21 (see FIG. 1) between the tank 14 and the vacuum apparatus 18, etc.), and therefore, the controller 20 activates an indicator in the vehicle, or an indicator of a stand-alone device in communication with the vehicle, to indicate that the vehicle did not pass the diagnostic test and the system 10 is ready for maintenance.

As such, if the amount of pressure created in the tank 14, the vapor control structure 16 and the fluid tubes 21 between the tank 14 and the vacuum apparatus 18, etc., begins to return to atmospheric pressure at a rate greater than a threshold, then an undesirable amount of vapors are seeping out of the system 10 (e.g., seeping out of one or more of the tank 14, the vapor control structure 16 and the fluid tubes 21 between the tank 14 and the vacuum apparatus 18, etc.) to the atmosphere, and thus, the system 10 is ready for maintenance. Therefore, for example, to run the diagnostic test, the vacuum apparatus 18 is actuated to create the vacuum in the tank 14, the vapor control structure 16 and the fluid tubes 21 between the tank 14 and the vacuum apparatus 18; and when the desired amount of pressure is reached in the tank 14, the vapor control structure 16 and the fluid tubes 21 between the tank 14 and the vacuum apparatus 18 by the vacuum, the vacuum apparatus 18 stops creating the vacuum and a timed count-down begins to measure the rate that the tank 14, the vapor control structure 16 and the fluid tubes 21 between the tank 14 and the vacuum apparatus 18 returns to atmospheric pressure.

Generally, in certain embodiments, the amount of time that the diagnostic test is performed is from about 8.0 seconds to about 12.0 seconds. Additionally, in certain embodiments, the amount of pressure created by the vacuum is less than 1.0 pound per square inch (psi) to about 0.20 psi. In one embodiment, the diagnostic test is performed for 10.0 seconds and the amount of pressure created by the vacuum is 0.25 psi. It is to be appreciated that the amount of pressure and the amount of time the diagnostic test is performed can be other values than the examples discussed above. Furthermore, it is to be appreciated that the threshold discussed above can be any suitable value to indicate whether an undesirable amount of vapors are seeping to atmosphere through one or more of the tank 14, the vapor control structure 16 and the fluid tubes 21 between the tank 14 and the vacuum apparatus 18, etc., to indicate whether the system 10 is ready for maintenance. The threshold will be obtained (and thus the vehicle will fail the diagnostic test) if, for example, an opening having a diameter from about 0.50 millimeters or greater is defined in one or more of the tank 14, the vapor control structure 16 and the fluid tubes 21 between the tank 14 and the vacuum apparatus 18, etc. is in communication with the atmosphere (i.e., the opening is in communication with the atmosphere).

The fluid detection system 10 can further include one or more on/off valves 24 between the tank 14 and the vacuum apparatus 18. The on/off valves 24 are in communication with the controller 20 such that the controller 20 can selectively actuate the on/off valves 24. Therefore, the controller 20 signals one or more of the on/off valves 24 to open to allow fluid, such as vapors, to flow therethrough and close to prevent fluid, such as vapors, from flowing therethrough. The on/off valves 24 can be a purge valve and/or a solenoid valve, etc. Generally, the fluid detection system 10 utilizes a plurality of on/off valves 24 as shown in FIG. 1. For example, the on/off valve 24 coupled to the vapor control structure 16 can be actuated to purge the vapor control structure 16 to atmospheric pressure, and the on/off valve 24 disposed between the vapor control structure 16 and the vacuum apparatus 18 can be actuated to apply the vacuum generally to the vapor control structure 16 and the tank 14. For example, the on/off valve 24 coupled to the vapor control structure 16 is closed during the diagnostic test and the on/off valve 24 between the vapor control structure 16 and the vacuum apparatus 18 is closed during the diagnostic test such that the vapors do not escape to the atmosphere through the on/off valves 24. To run the diagnostic test, the vacuum apparatus 18 is actuated to create the vacuum in the tank 14, the vapor control structure 16 and the fluid tubes 21 between the tank 14 and the vacuum apparatus 18, etc.; and once the desired amount of pressure is reached by the vacuum, the vacuum apparatus 18 stops creating the vacuum and both of the on/off valves 24 are closed and the timed count-down (as discussed above) begins.

The controller 20, shown schematically in FIG. 1, can be embodied as a digital computer device or multiple such devices in communication with the various components of the vehicle. For example, as mentioned above, the controller 20 is in communication with the sensor(s) 22 and the on/off valve(s) 24. Structurally, the controller 20 can include at least one microprocessor 26 along with sufficient tangible, non-transitory memory 28, e.g., read-only memory (ROM), flash memory, optical memory, additional magnetic memory, etc. The controller 20 can also include any required random access memory (RAM), electrically-programmable read only memory (EPROM), a high-speed clock, analog-to-digital (A/D) and/or digital-to-analog (D/A) circuitry, and any input/output circuitry or devices, as well as any appropriate signal conditioning and buffer circuitry. Instructions for executing a method 1000 for creating the vacuum are recorded in the memory 28 and executed as needed via the microprocessor(s) 26.

Referring to FIG. 1, the valve assembly 12 includes a valve body 30 adapted to be attached to the tank 14. Therefore, the valve body 30 can be internally or externally mounted to the tank 14. For example, as shown in FIG. 1, a portion of the valve body 30 can be disposed inside the tank 14 and another portion of the valve body 30 can be disposed outside of the tank 14 for the externally mounted embodiment.

Turning to FIG. 2, generally, the valve body 30 defines a cavity 32 along a longitudinal axis 34 and defines an outlet 36 in fluid communication with the cavity 32 for venting the tank 14. Therefore, vapors in the tank 14 can be vented through the cavity 32 and out the outlet 36 to the vapor control structure 16.

Continuing with FIG. 2, the valve assembly 12 further includes a seat 38 disposed in the cavity 32 of the valve body 30 and separating the cavity 32 into a first cavity portion 40 and a second cavity portion 42. The seat 38 defines an aperture 44 along the longitudinal axis 34 to provide fluid communication between the first and second cavity portions 40, 42. Generally, the seat 38 can include a first surface 46 facing the first cavity portion 40 and a second surface 48 facing the second cavity portion 42. Furthermore, the aperture 44 is disposed through the first and second surfaces 46, 48.

In certain embodiments, the seat 38 includes a platform 50 defining the aperture 44 along the longitudinal axis 34 to provide fluid communication between the first and second cavity portions 40, 42. In addition, in certain embodiments, the platform 50 includes the first surface 46 facing the first cavity portion 40 and the second surface 48 facing the second cavity portion 42. Furthermore, in certain embodiments, the seat 38 can include a protrusion 52 extending from the platform 50 into the second cavity portion 42, with the protrusion 52 further defining the aperture 44. The seat 38 can be further defined as a first seat 38 and will be referred to as the first seat 38 for the below discussion.

Figure 3:
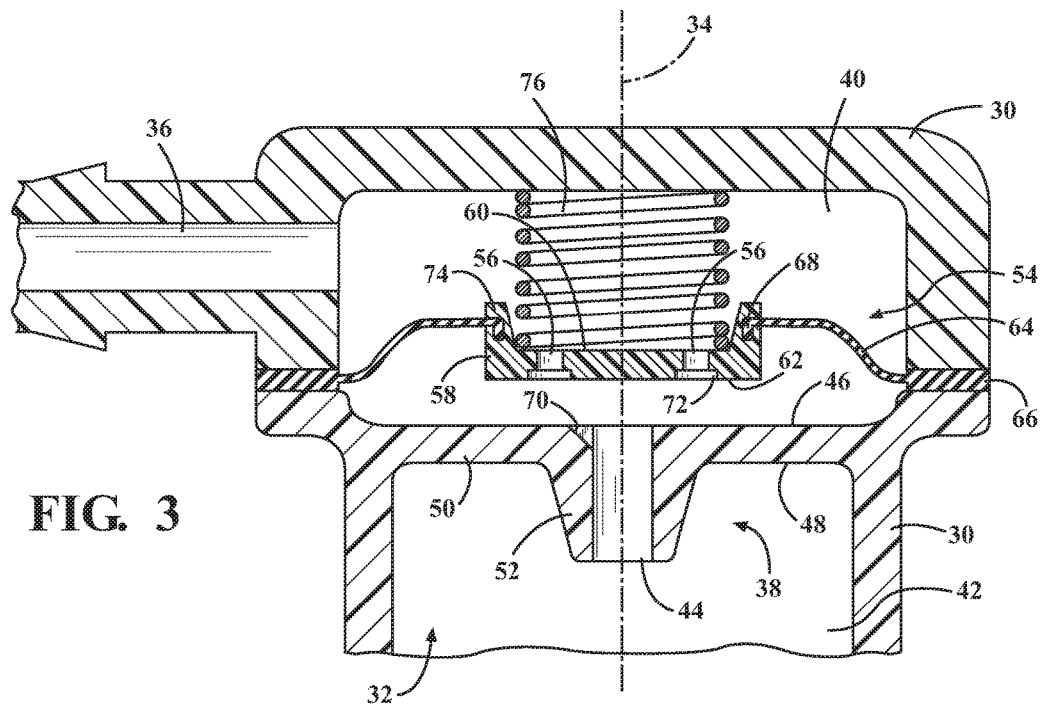
FIG. 3 is a schematic broken cross-sectional view of the cover device in an actuated position.
Figure 5:
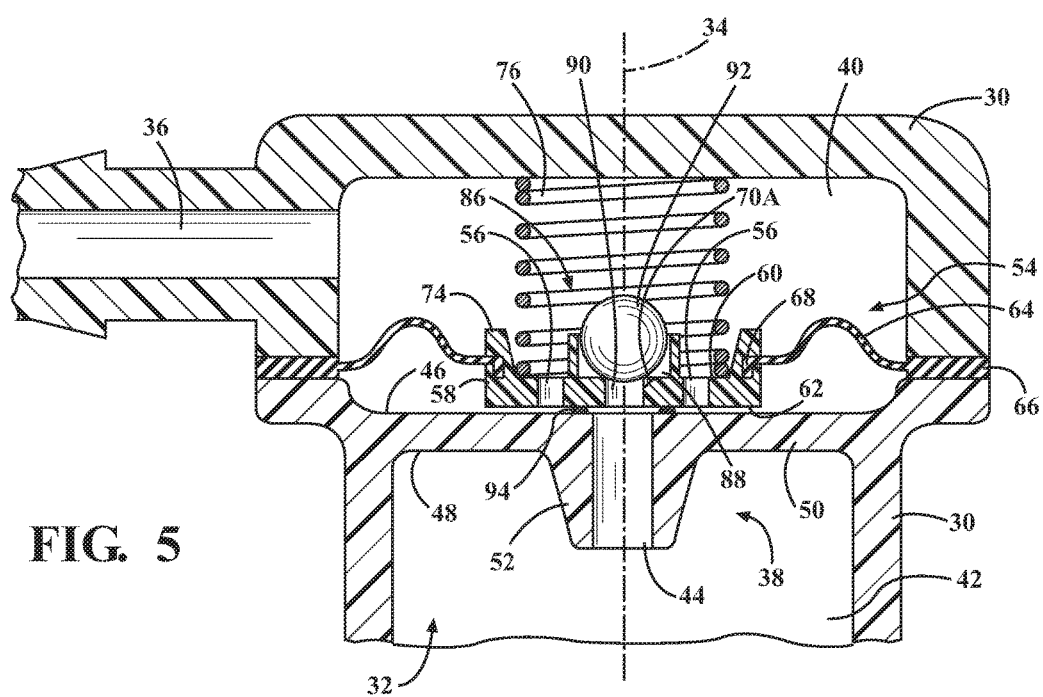
FIG. 5 is a schematic broken cross-sectional view of another embodiment of the cover device.

Referring to FIGS. 2-5, the valve assembly 12 also includes a cover device 54 disposed between the first seat 38 and the outlet 36. More specifically, the cover device 54 is disposed in the first cavity portion 40. The cover device 54 defines at least one hole 56 therethrough. Generally, the cover device 54 is movable between a rest position engaging the first seat 38 to minimize fluid communication between the first and second cavity portions 40, 42 and an actuated position spaced from the first seat 38 to increase fluid communication between the first and second cavity portions 40, 42 when a vacuum is created in the first cavity portion 40. More specifically, the cover device 54 is movable between the rest position engaging the first seat 38 to minimize fluid communication between the aperture 44 and the hole 56 and the actuated position spaced from the first seat 38 to increase fluid communication between the aperture 44 and the hole 56 when the vacuum is created in the first cavity portion 40. Specifically, in certain embodiments, the cover device 54 is movable between the rest position engaging the platform 50 to minimize fluid communication between the aperture 44 and the hole 56 and the actuated position spaced from the platform 50 to increase fluid communication between the aperture 44 and the hole 56 when the vacuum is created in the first cavity portion 40. Therefore, when the vacuum apparatus 18 is actuated, the vacuum is created in the system 10 (e.g., created in the tank 14, the vapor control structure 16 and the fluid tubes 21 between the tank 14 and the vacuum apparatus 18, etc.), which pulls the vapors toward the vacuum apparatus 18. Generally, when the vacuum is initially created, the vacuum is created in the first cavity portion 40 of the valve body 30 which causes the cover device 54 to move to the actuated position such that vapors flow from the second cavity portion 42 to the first cavity portion 40 to create the vacuum in the second cavity portion 42 and thus the tank 14. If too much time passes to create the vacuum, the sensor 22 could falsely determine that the vehicle is ready for maintenance. Therefore, the cover device 54 is designed to quickly open when the vacuum is created to quickly create the vacuum in the system 10 which minimize the sensor 22 falsely indicating that the vehicle is ready for maintenance. For example, when running the diagnostic test, as soon as the vacuum is created in the first cavity portion 40, the cover device 54 can instantaneously open (move to the actuated position). As another example, when running the diagnostic test, the cover device 54 can open (move to the actuated position) from about 1.0 seconds to about 2.0 seconds after the vacuum is created in the first cavity portion 40. The rest position of the cover device 54 is shown in FIGS. 2 and 5 and the actuated position of the cover device 54 is shown in FIG. 3.

The cover device 54 separates the first cavity portion 40 into a first pocket and a second pocket. The aperture 44 is in direct fluid communication with the first pocket when the cover device 54 is in the actuated position. The outlet 36 is in direct fluid communication with the second pocket when the cover device 54 is in the rest position and the actuated position. Fluid communication between the first and second pockets is through the hole 56. The cover device 54 includes a pair of sides, with one of the sides defining a boundary of the first pocket of the first cavity portion 40 and another one of the sides defining a boundary of the second pocket of the first cavity portion 40. The aperture 44 is separated from the outlet 36 by the sides of the cover device 54.

Continuing with FIGS. 2-5, the cover device 54 can include a plate 58 movable between the rest and actuated positions to selectively engage the first seat 38. In certain embodiments, the plate 58 can selectively engage the platform 50. Furthermore, in certain embodiments, the plate 58 can selectively engage the first surface 46 of the first seat 38 or the first surface 46 of the platform 50. In certain embodiments, the plate 58 is formed of a polymeric material. One suitable polymeric material is plastic. It is to be appreciated that the plate 58 can be formed of any suitable polymeric material or any other suitable material.

Generally, the plate 58 can define the at least one hole 56. In certain embodiments, the at least one hole 56 is further defined as a plurality of holes 56 spaced from each other, with the plate 58 defining the holes 56. The plate 58 can include a first side 60 and a second side 62 opposing each other, with the first and second sides 60, 62 of the plate 58 defining the holes 56 therethrough. Generally, the second side 62 of the plate 58 faces the first surface 46 of the first seat 38. It is to be appreciated that the holes 56 can be any suitable configuration and location.

The cover device 54 can also include a diaphragm 64 attached to the plate 58 and the valve body 30 such that the plate 58 and the diaphragm 64 cooperate to cover the first seat 38, and more specifically, cover the platform 50. Generally, the diaphragm 64 is at least partially movable with the plate 58 between the rest and actuated positions. The diaphragm 64 is spaced from the first surface 46 when the plate 58 is in the rest and actuated positions. In other words, the diaphragm 64 remains spaced from the first surface 46. Generally, as best shown in FIGS. 2, 3 and 5, the diaphragm 64 surrounds the plate 58, with an outer edge 66 of the diaphragm 64 attached to the valve body 30 and an inner edge 68 of the diaphragm 64 attached to the plate 58. When the vacuum is applied to the first cavity portion 40, the vacuum acts on the large surface area of the diaphragm 64 which moves the plate 58 to the actuated position. The large surface area of the diaphragm 64 assists to quickly move the cover device 54 to the actuated position when the vacuum is applied to the first cavity portion 40.

The diaphragm 64 is flexible to allow movement of the plate 58 between the rest and actuated positions. Therefore, in certain embodiments, the diaphragm 64 is formed of an elastomer. One suitable elastomer is rubber. It is to be appreciated that the diaphragm 64 can be formed of any suitable elastomer or material. It is to also be appreciated that the plate 58 and the diaphragm 64 can be integrally formed to each other or formed of one piece.

In certain embodiments, optionally, the first surface 46 of the first seat 38 defines a notch 70 (see FIGS. 2-4) adjacent to the aperture 44 to provide fluid communication between the first and second cavity portions 40, 42 to substantially equalize small pressure differences between the first and second cavity portions 40, 42 when the cover device 54 is in the rest position. In other words, when the plate 58 engages the aperture 44, the notch 70 allows a small amount of vapors to communicate between the first and second cavity portions 40, 42 such that small pressure differentials between the first and second cavity portions 40, 42 can be equalized. Therefore, these small pressure differences between the first and second cavity portions 40, 42 are less than the pressure differences which cause the cover device 54 to move to the actuated position. Generally, the notch 70 can be referred to as a bleed notch.

Turning to FIGS. 2 and 3, optionally, the second side 62 of the plate 58 can define a groove 72 in fluid communication with the holes 56, and in certain embodiments in fluid communication with the notch 70. Therefore, one or more holes 56 are in fluid communication with the groove 72. Generally, the groove 72 is disposed between the holes 56 and the first surface 46 of the first seat 38 such that the holes 56 are spaced from the first surface 46 of the first seat 38 when the plate 58 is in the rest position. Furthermore, the holes 56 are spaced from the first surface 46 of the first seat 38 when the plate 58 is in the actuated position.

Figure 4:
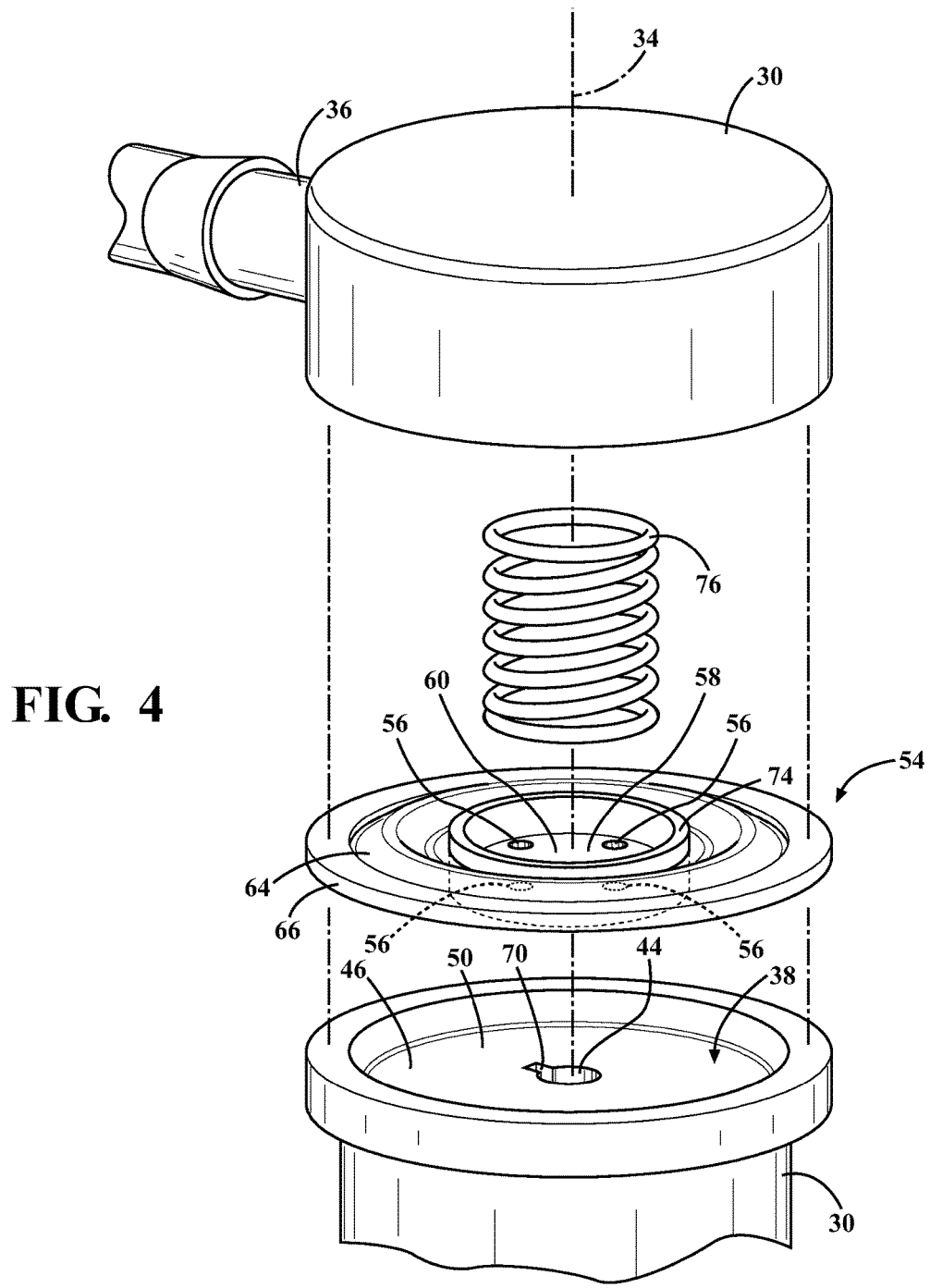
FIG. 4 is a schematic partial exploded view of the cover device.

Referring to FIGS. 2-4, the plate 58 can also include a second seat 74 extending from the first side 60 facing away from the first seat 38. The valve assembly 12 can also include a biasing member 76 disposed in the first cavity portion 40 and engaging the valve body 30 and the first side 60 of the plate 58. Generally, the second seat 74 surrounds the biasing member 76 to position the biasing member 76 relative to the plate 58. Furthermore, the second seat 74 surrounds the holes 56. The biasing member 76 continuously biases the cover device 54 to the rest position. In other words, the biasing member 76 continuously biases the plate 58 into engagement with the first surface 46 of the first seat 38, and more specifically, into engagement with the first surface 46 of the platform 50. Generally, the biasing member 76 and the cover device 54, and more specifically the plate 58, cooperate to act as a head valve to limit vapors exiting the fuel tank during certain conditions, such as for example, during refueling. When the vacuum is applied to the first cavity portion 40, the vacuum acts on the large surface area of the diaphragm 64 which moves the cover device 54 to the actuated position, and thus the cover device 54 bypasses the head valve function. The biasing member 76 can be a coil spring, a dead weight, or any other suitable configuration.

Generally, the first and second cavity portions 40, 42 have a substantially equal first pressure when the cover device 54 is in the rest position. In other words, the first and second cavity portions 40, 42 each have a pressure substantially equal to each other when the cover device 54 is in the rest position. Said differently, the first and second cavity portions 40, 42 each have a substantially equal pressure when the cover device 54 is in the rest position. The first cavity portion 40 obtains a second pressure less than the first pressure of the second cavity portion 42 when the vacuum is created in the first cavity portion 40 which moves the cover device 54 to the actuated position such that gaseous fluid flows from the second cavity portion 42 through the first cavity portion 40 and out the outlet 36. Therefore, the first cavity portion 40 obtains the second pressure less than the first pressure of the second cavity portion 42 when the vacuum is created in the first cavity portion 40 which moves the cover device 54 to the actuated position to increase fluid communication between the first and second cavity portions 40, 42. Simply stated, when the gaseous fluid is removed from the first cavity portion 40 of the valve body 30 to create the vacuum in the first cavity portion 40, a pressure difference is obtained between the first and second cavity portions 40, 42. The vacuum created in the first cavity portion 40 quickly pops the cover device 54 to the actuated position such that vapor flow is increased between the first and second cavity portions 40, 42. Once the cover device 54 moves to the actuated position, vapors flow from the second cavity portion 42 into the first cavity portion 40 and out the outlet 36 such that the vacuum is created in the tank 14. The cover device 54 is designed to quickly open when the vacuum is created to quickly create the vacuum in the tank 14 which minimize the sensor 22 falsely indicating that the vehicle is ready for maintenance. When the vacuum apparatus 18 is actuated to create the vacuum, vapors are pulled into the vacuum apparatus 18 from the vapor control structure 16, the tank 14 and the fluid lines 21 between the tank 14 and the vacuum apparatus 18. It is to be appreciated when the vacuum is created in the first cavity portion 40, the pressure differential between the first and second cavity portions 40, 42 also overcomes the force being applied to the plate 58 by the biasing member 76; therefore, the cover device 54 also overcomes the force being applied by the biasing member 76 when moving to the actuated position.

As shown in FIG. 2, the valve assembly 12 can further include various other components to minimize the liquid fluid, such as fuel, in the tank 14 from entering the vapor control structure 16. For example, a float 78 can be disposed in the second cavity portion 42 of the valve body 30. Generally, the float 78 is movable along the longitudinal axis 34 between a first position and a second position relative to the valve body 30 in response to a fluid level 80 (see FIG. 1) inside the tank 14. The float 78 is shown in the first position in FIG. 2. In other words, when the float 78 is combined with a biasing force from a second biasing member 82, the float 78 is buoyant in the fuel stored in the tank 14. Thus, the float 78 can move along the longitudinal axis 34 depending on the fluid level 80 of the fuel inside the tank 14. For example, if the fluid level 80 rises, the float 78 moves toward the first seat 38. As another example, if the fluid level 80 descends, the float 78 moves away from the first seat 38. It is to be appreciated that in a vehicle roll-over situation, the float 78 will move to the second position without the buoyancy of the float 78 affecting the float's position due to the biasing force of the second biasing member 82 overcoming the buoyancy of the float 78.

As another example, a sealing member 84 can be coupled to the float 78. The sealing member 84 is spaced from the first seat 38 when the float 78 is in the first position to increase fluid communication through the aperture 44. The sealing member 84 engages the first seat 38 when the float 78 is in the second position to minimize fluid communication through the aperture 44. More specifically, in certain embodiments, the sealing member 84 is spaced from the protrusion 52 when the float 78 is in the first position and the sealing member 84 engages the protrusion 52 when the float 78 is in the second position. Thus, if the vehicle is partially/fully rolled over, the float 78 can move to the second position and the sealing member 84 engages the first seat 38 to seal the aperture 44, which minimizes fuel from entering into the vapor control structure 16. Furthermore, if the fluid level 80 is high in the tank 14 and the vehicle is on the grade, the fuel shifts in the tank 14 which can also cause the float 78 to move to the second position and the sealing member 84 into engagement with the first seat 38, which minimizes fuel from entering into the vapor control structure 16. In addition, if the vehicle is being drove such that the fuel is sloshing around in the tank 14, the sealing member 84 can engage the first seat 38 to seal the aperture 44 to minimize fuel from entering the vapor control structure 16. Liquid fluid or fuel could affect or saturate the vapor control structure 16 if the liquid fluid or fuel reaches the vapor control structure 16. Therefore, for example, the sealing member 84 selectively engages the first seat 38 to seal the aperture 44 to prevent liquid fluid or fuel from entering the vapor control structure 16.

Generally, when the vacuum is created, the float 78 is in the first position and the sealing member 84 is spaced from the first seat 38 to allow vapors to flow through the aperture 44. More specifically, the float 78 is in the first position when the vacuum apparatus 18 is actuated such that when the cover device 54 moves to the actuated position, vapors can flow from the tank 14 through the aperture 44. In other words, the float 78 is in the first position when the vacuum is created to move the cover device 54 to the actuated position such that gaseous fluid flows from the second cavity portion 42 through the aperture 44 and the hole 56, through the first cavity portion 40, and out the outlet 36.

In addition to the above, the configuration of the cover device 54 of FIGS. 2-4 can change. Generally, the cover device 54 of FIG. 5 functions the same as discussed above for FIGS. 2-4 and therefore the specific details will not be re-discussed for this embodiment. In the embodiment of FIG. 5, the plate 58 of the cover device 54 can be modified to accommodate a head valve 86. For example, the head valve 86 can be disposed in the first cavity portion 40. The head valve 86 can include a third seat 88 extending from the plate 58 and opposing the first seat 38, with the third seat 88 extending outwardly from the plate 58 away from the second cavity portion 42. Generally, the third seat 88 is spaced from the holes 56 and spaced from the second seat 74. Furthermore, the plate 58 can define a bore 90 along the longitudinal axis 34 between the holes 56. Therefore, the third seat 88 surrounds the bore 90 and the holes 56 are disposed between the third seat 88 and the second seat 74. It is to be appreciated that the plate 58 and the third seat 88 can be integrally formed to each other. In other words, the plate 58 and the third seat 88 can be formed of one piece.

The head valve 86 can also include a blocking member 92 movably disposed in the third seat 88 such that the blocking member 92 selectively closes the bore 90. Generally, the blocking member 92 rests in the third seat 88 to close the bore 90 while the float 78 is in the first position. The blocking member 92 moves away from the third seat 88 to open the bore 90 when the tank 14 exceeds a predetermined pressure while the float 78 is in the first position. When the blocking member 92 moves away from the third seat 88, vapors can vent through the bore 90 into the vapor control structure 16. For example, the blocking member 92 can move away from the third seat 88 to open the bore 90 during operation of the vehicle when there is a large pressure differential between the tank 14 and the second cavity portion 42. Generally, the blocking member 92 remains in engagement with the plate 58 (blocking the bore 90) when the vacuum is created by the vacuum apparatus 18 and the cover device 54 moves to the actuated position. Furthermore, the blocking member 92 generally remains in engagement with the plate 58 (blocking the bore 90) during refueling of the vehicle which is a relatively low pressure event. It is to be appreciated that the head valve 86 does not affect the function of the cover device 54. In certain embodiments, the blocking member 92 can be a ball as shown in FIG. 5. It is to be appreciated that the blocking member 92 can be any suitable configuration. The head valve 86 can also be referred to as a pressure relief valve.

The notch 70 as discussed above for the embodiment of FIGS. 2-4 can be relocated for the embodiment of FIG. 5.

For example, the notch 70A can be disposed adjacent to the bore 90 (see FIG. 5) instead of adjacent to the aperture 44 (see FIGS. 2-4). The notch 70A provides fluid communication between the first and second cavity portions 40, 42 to substantially equalize small pressure differences between the first and second cavity portions 40, 42 when the cover device 54 is in the rest position. In other words, the notch 70A allows a small amount of fluid communication between the first and second cavity portions 40, 42 when the blocking member 92 engages the bore 90 to substantially equalize small pressure differentials. Therefore, these small pressure differences between the first and second cavity portions 40, 42 are less than the pressure differences which cause the cover device 54 to move to the actuated position.

Optionally, the cover device 54 can include a seal 94 (see FIG. 5) coupled to one of the first surface 46 of the first seat 38 and the second side 62 of the plate 58 for minimizing fluid flowing or escaping between the first seat 38 and the plate 58 when the plate 58 is in the rest position. In one embodiment, the seal 94 is attached to the first surface 46 of the first seat 38. In another embodiment, the seal 94 is attached to the second side 62 of the plate 58. The seal 94 is generally disposed between the bore 90 and the holes 56. In other words, the seal 94 surrounds the bore 90. It is to be appreciated that the seal 94 can be any suitable configuration and location. Furthermore, the seal 94 can be utilized in the embodiment of FIGS. 2-4. It is to also be appreciated that optionally, the groove 72 can be eliminated in the cover device 54 as shown in FIG. 5.

Figure 6:
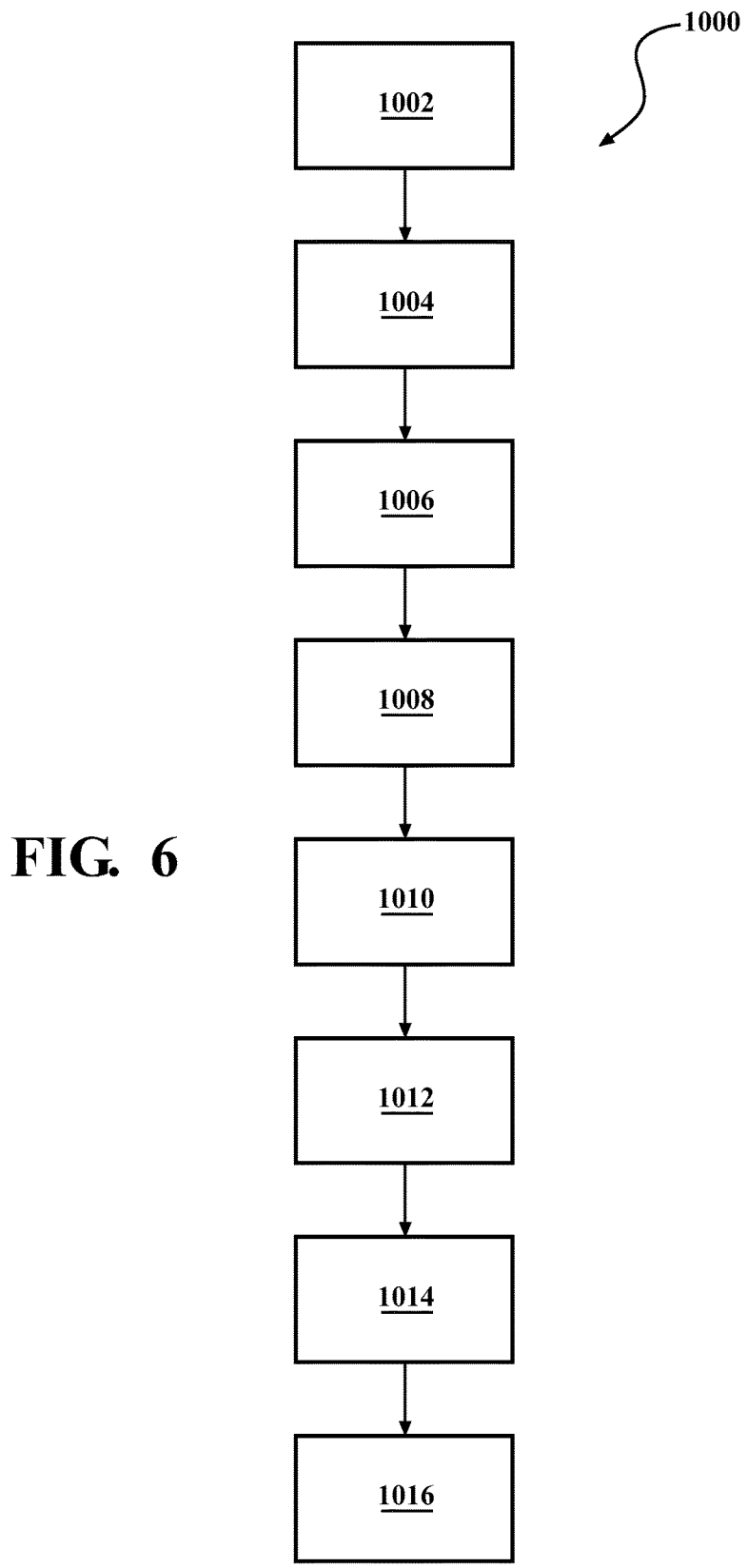
FIG. 6 is schematic flowchart of a method of creating a vacuum in the tank of FIGS. 1-5.

Turning to FIG. 6, the present teachings also provide the method 1000 of creating the vacuum in the tank 14 of the vehicle when performing the diagnostic test. The method 1000 includes providing 1002 the valve body 30 adapted to be attached to the tank 14. The valve body 30 can be attached to the tank 14 as discussed above. The valve body 30 includes the first cavity portion 40 and the second cavity portion 42 separated by the first seat 38 as also discussed above.

The method 1000 also includes minimizing 1004 flow of gaseous fluid between the hole 56 in the cover device 54 and the aperture 44 of the seat 38 when the cover device 54 is in the rest position engaging the seat 38. The first and second cavity portions 40, 42 each have the substantially equal pressure when the cover device 54 is in the rest position. It is to be appreciated that the gaseous fluid can be vapors as discussed above.

The method 1000 further includes removing 1006 gaseous fluid from the first cavity portion 40 of the valve body 30 to create the vacuum in the first cavity portion 40 and the pressure difference between the first and second cavity portions 40, 42. In addition, the method 1000 includes moving 1008 the cover device 54 to the actuated position spaced from the seat 38 in response to the vacuum creating the pressure difference between the first and second cavity portions 40, 42. Furthermore, the method 1000 includes increasing 1010 flow of the gaseous fluid between the hole 56 in the cover device 54 and the aperture 44 of the seat 38 when the cover device 54 is in the actuated position to increase flow of the gaseous fluid between the first and second cavity portions 40, 42 to create the vacuum in the tank 14.

Furthermore, the method 1000 can include actuating 1012 the vacuum apparatus 18 to create the vacuum in the tank 14. More specifically, actuating 1012 the vacuum apparatus 18 can include signaling the vacuum apparatus 18, via the controller 20, to actuate. Therefore, the vacuum apparatus 18 can pull the vapors through the system 10 (e.g., through the tank 14, the vapor control structure 16 and the fluid tubes 21 between the tank 14 and the vacuum apparatus 18, etc.) to the vacuum apparatus 18 to create the vacuum. The method 1000 can further include signaling 1014 one or more of the on/off valves 24, via the controller 20, to open or close when the vacuum is created. In one embodiment, the on/off valves 24 are closed when the vacuum is created.

The method 1000 can include signaling 1016 the controller 20, via one or more sensors 22, whether the desired amount of pressure for the desired amount of time has been obtained in the system 10. If the desired amount of pressure for the desired amount of time has been obtained, the flow of gaseous fluid from the tank 14 to the vacuum apparatus 18 is suitable and the vehicle passes the diagnostic test. If the desired amount of pressure for the desired amount of time is not obtained, an undesirable amount of gaseous fluid is seeping to atmosphere in the system 10 (e.g., seeping through one or more of the tank 14, the vapor control structure 16 and the fluid tubes 21 between the tank 14 and the vacuum apparatus 18, etc.), and therefore, the controller 20 activates the indicator in the vehicle, or the indicator of the stand-along device, to indicate that the vehicle did not pass the diagnostic test and the system 10 is ready for maintenance.

It is to be appreciated that the order or sequence of performing the method 1000 as identified in the flowchart of FIG. 6 is for illustrative purposes and other orders or sequences are within the scope of the present teachings. It is to also be appreciated that the method 1000 can include other features not specifically identified in the flowcharts of FIG. 6.

Various other parameters can be included to perform the diagnostic test. For example, when performing the diagnostic test, the vehicle has remained off for, at least, from about 4 hours to about 8 hours to allow the engine temperature to be about the same or identical to the air temperature outside. As another example, when performing the diagnostic test, the tank 14 is from about 15 percent to about 85 percent full of fuel. Generally, two diagnostic tests are performed in sequence to determine whether the system 10 is ready for maintenance.

The reference numbers used in the drawings and the specification and the corresponding components are as follows:

10 fluid detection system
12 valve assembly
14 tank
16 vapor control structure
18 vacuum apparatus
20 controller
21 fluid tubes
22 sensors
24 on/off valves
26 microprocessor
28 memory
30 valve body
32 cavity
34 longitudinal axis
36 outlet
38 first seat
40 first cavity portion
42 second cavity portion
44 aperture
46 first surface
48 second surface
50 platform
52 protrusion 54 cover device
56 hole
58 plate
60 first side
62 second side
64 diaphragm
66 outer edge
68 inner edge
70 notch
72 groove
74 second seat
76 biasing member
78 float
80 fluid level
82 second biasing member
84 sealing member
86 head valve
88 third seat
90 bore
92 blocking member
94 seal
1000 method
1002 providing
1004 minimizing
1006 removing
1008 moving
1010 increasing
1012 actuating
1014 signaling
1016 signaling While the best modes for carrying out the many aspects of the present teachings have been described in detail, those familiar with the art to which these teachings relate will recognize various alternative aspects for practicing the present teachings that are within the scope of the appended claims.

The invention claimed is:

1. A valve assembly for a tank of a vehicle, the assembly comprising:
   a valve body adapted to be attached to the tank, with the valve body defining a cavity along a longitudinal axis and defining an outlet in fluid communication with the cavity for venting the tank;
   a seat disposed in the cavity of the valve body and separating the cavity into a first cavity portion and a second cavity portion, with the seat defining an aperture along the longitudinal axis to provide fluid communication between the first and second cavity portions; and
   a cover device disposed between the seat and the outlet, with the cover device defining at least one hole through the cover device such that fluid communication between the aperture and the outlet is through the hole of the cover device, and with the cover device movable between a rest position engaging the seat to minimize fluid communication between the aperture and the hole, and an actuated position spaced from the seat to increase fluid communication between the aperture and the hole when a vacuum is created in the first cavity portion;
   wherein the cover device separates the first cavity portion into a first pocket and a second pocket, and wherein the aperture is in direct fluid communication with the first pocket when the cover device is in the actuated position, and the outlet is in direct fluid communication with the second pocket when the cover device is in the rest position and the actuated position.

2. An assembly as set forth in claim 1 wherein the cover device includes a plate movable between the rest and actuated positions to selectively engage the seat, with the plate defining the at least one hole.

3. An assembly as set forth in claim 2 wherein the cover device includes a diaphragm attached to the plate and the valve body such that the plate and the diaphragm cooperate to cover the seat, with the diaphragm at least partially movable with the plate between the rest and actuated positions.

4. An assembly as set forth in claim 2 wherein the at least one hole is further defined as a plurality of holes spaced from each other, with the plate defining the holes.

5. An assembly as set forth in claim 3 wherein the seat includes a first surface facing the first cavity portion and a second surface facing the second cavity portion, with the plate selectively engaging the first surface of the seat, and with the diaphragm spaced from the first surface when the plate is in the rest and actuated positions.

6. An assembly as set forth in claim 5 wherein the first surface of the seat defines a notch adjacent to the aperture to provide fluid communication between the first and second cavity portions to substantially equalize small pressure differences between the first and second cavity portions when the cover device is in the rest position.

7. An assembly as set forth in claim 6 wherein the at least one hole is further defined as a plurality of holes spaced from each other and wherein the plate includes a first side and a second side opposing each other, with the first and second sides of the plate defining the holes therethrough, and wherein the second side of the plate defines a groove in fluid communication with one of the holes and the notch, with the groove disposed between the one of the holes and the first surface of the seat such that the one of the holes is spaced from the first surface of the seat when the plate is in the rest position.

8. An assembly as set forth in claim 1 wherein the cover device includes a plate, and the plate includes a first side and a second side opposing each other and wherein the seat is further defined as a first seat and the plate includes a second seat extending from the first side facing away from the first seat, and further including a biasing member disposed in the first cavity portion and engaging the valve body and the first side of the plate, with the second seat surrounding the biasing member to position the biasing member relative to the plate.

9. An assembly as set forth in claim 1 wherein the first and second cavity portions have a substantially equal first pressure when the cover device is in the rest position before the vacuum has been created, and the first cavity portion obtains a second pressure less than the first pressure of the second cavity portion when the vacuum is created in the first cavity portion by fluid being removed from the first cavity portion through the outlet while the cover device is in the rest position which causes the cover device to move to the actuated position such that fluid flows from the second cavity portion through the first cavity portion and out the outlet.

10. An assembly as set forth in claim 1 further including a float disposed in the second cavity portion of the valve body, with the float movable along the longitudinal axis between a first position and a second position relative to the valve body in response to a fluid level inside the tank, and further including a sealing member coupled to the float, with the sealing member spaced from the seat when the float is in the first position and the sealing member engages the seat when the float is in the second position, and with the float being in the first position when the vacuum is created such that fluid flows from the second cavity portion through the aperture, the first cavity portion, and the hole, and out the outlet.

11. An assembly as set forth in claim 1 wherein the vacuum is created by expelling gaseous fluid out of the outlet when the cover device is in the rest position which causes a pressure difference between the first cavity portion and the second cavity portion, and the pressure difference causes the cover device to move to the actuated position such that the gaseous fluid flows from the second cavity portion through the cover device and out the outlet.

12. An assembly as set forth in claim 1 wherein the aperture of the seat and the outlet of the valve body are spaced apart relative to opposite sides of the cover device relative to a flow of gaseous fluid.

13. An assembly as set forth in claim 1 wherein the cover device includes a plate and a diaphragm attached to each other, with the plate formed of a material different from the diaphragm.

14. An assembly as set forth in claim 1 wherein fluid communication between the first and second pockets is through the hole, and wherein the cover device includes a pair of sides, with one of the sides defining a boundary of the first pocket of the first cavity portion and another one of the sides defining a boundary of the second pocket of the first cavity portion, and wherein the aperture is separated from the outlet by the sides of the cover device.

15. A valve assembly for a tank of a vehicle, the assembly comprising:
    a valve body adapted to be attached to the tank, with the valve body defining a cavity along a longitudinal axis and defining an outlet in fluid communication with the cavity for venting the tank;
    a seat disposed in the cavity of the valve body and separating the cavity into a first cavity portion and a second cavity portion, with the seat including a platform defining an aperture along the longitudinal axis to provide fluid communication between the first and second cavity portions; and
    a cover device disposed between the seat and the outlet, with the cover device defining at least one hole through the cover device, and with the cover device movable between a rest position engaging the platform to minimize fluid communication between the aperture and the hole and an actuated position spaced from the platform to increase fluid communication between the aperture and the hole when a vacuum is created in the first cavity portion;
    wherein the first and second cavity portions have a substantially equal first pressure when the cover device is in the rest position before the vacuum has been created, and the first cavity portion obtains a second pressure less than the first pressure of the second cavity portion when the vacuum is created in the first cavity portion by gaseous fluid being removed from the first cavity portion through the outlet while the cover device is in the rest position which causes the cover device to move to the actuated position to increase fluid communication between the first and second cavity portions.

16. An assembly as set forth in claim 15 wherein the cover device includes a plate movable between the rest and actuated positions to selectively engage the platform, with the plate defining the at least one hole, and wherein the cover device includes a diaphragm attached to the plate and the valve body such that the plate and the diaphragm cooperate to cover the platform, with the diaphragm at least partially movable with the plate between the rest and actuated positions.

17. An assembly as set forth in claim 16 wherein the platform includes a first surface facing the first cavity portion and a second surface facing the second cavity portion, with the plate selectively engaging the first surface of the platform, with the diaphragm being spaced from the first surface when the plate is in the rest and actuated positions.

18. An assembly as set forth in claim 15 wherein the seat includes a protrusion extending from the platform into the second cavity portion, with the protrusion further defining the aperture, and further including a float disposed in the second cavity portion of the valve body, with the float movable along the longitudinal axis between a first position and a second position relative to the valve body in response to a fluid level inside the tank, and further including a sealing member coupled to the float, with the sealing member spaced from the protrusion when the float is in the first position and the sealing member engages the protrusion when the float is in the second position, and with the float being in the first position when the vacuum is created such that gaseous fluid flows from the second cavity portion through the aperture, the first cavity portion, and the hole, and out the outlet.

19. A method of creating a vacuum in a tank of a vehicle when performing a diagnostic test, the method comprising:
    providing a valve body adapted to be attached to the tank, with the valve body including a first cavity portion and a second cavity portion separated by a seat;
    minimizing flow of gaseous fluid between a hole in a cover device and an aperture of the seat when the cover device is in a rest position engaging the seat;
    removing gaseous fluid from the first cavity portion of the valve body out through an outlet of the valve body while the cover device is in the rest position to create the vacuum in the first cavity portion and a pressure difference between the first and second cavity portions;
    moving the cover device to an actuated position spaced from the seat in response to the vacuum creating the pressure difference between the first and second cavity portions; and
    increasing flow of the gaseous fluid between the hole in the cover device and the aperture of the seat when the cover device is in the actuated position to increase flow of the gaseous fluid between the first and second cavity portions.

20. A method as set forth in claim 19 wherein the aperture of the seat and the outlet of the valve body are spaced apart relative to opposite sides of the cover device, and wherein removing the gaseous fluid includes expelling the gaseous fluid out of the outlet and from the first cavity portion relative to one side of the cover device while the cover device is in the rest position.

* * * * *